J. A. SUDDARTH.
RESILIENT WHEEL.
APPLICATION FILED MAR. 25, 1911.
1,011,091.
Patented Dec. 5, 1911.
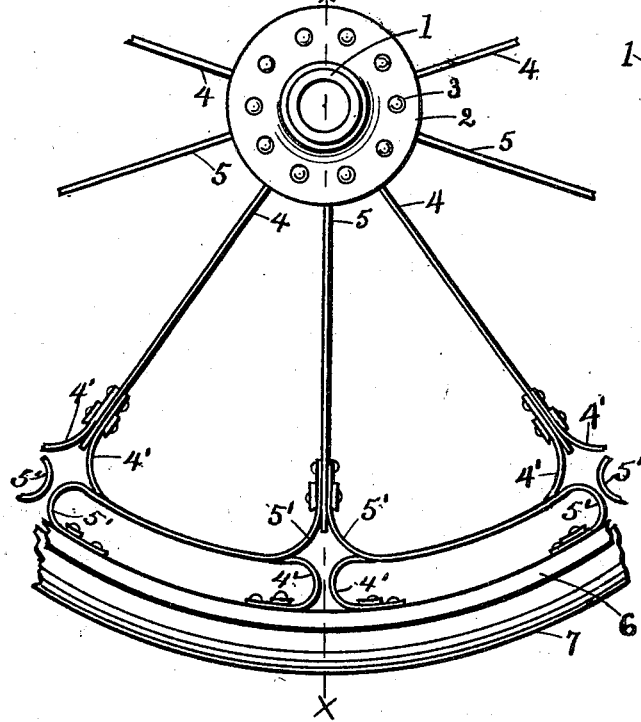
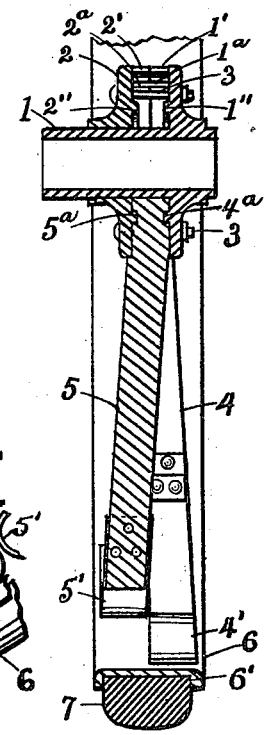
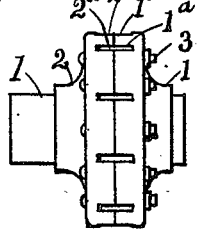
WITNESSES:
Edith Wiedmann.
Luke E. Hinton.
INVENTOR.
Johnson A. Suddarth
BY George W. Hinton
ATTORNEY.

UNITED STATES PATENT OFFICE.

JOHNSON A. SUDDARTH, OF ST. JOSEPH, MISSOURI.

RESILIENT WHEEL.

1,011,091.　　　　　Specification of Letters Patent.　　Patented Dec. 5, 1911.

Application filed March 25, 1911. Serial No. 616,834.

*To all whom it may concern:*

Be it known that I, JOHNSON A. SUDDARTH, a citizen of the United States, residing at St. Joseph, in the county of Buchanan and State of Missouri, have invented certain new and useful Improvements in Resilient Wheels, of which the following is a specification, reference being had therein to the accompanying drawing.

My invention relates to improvements in resilient wheels, the objects of which are to provide a wheel of this class which shall be extremely resilient, not at all liable to be warped out of alinement, and which shall be extremely simple in construction and cheap in cost of manufacture. I attain these objects by the mechanism illustrated in the accompanying drawing in which:—

Figure 1 is front view of a portion of the wheel. Fig. 2 is a section on the line X X seen in Fig. 1, looking toward the left, said section being cut longitudinally through the hub. Fig. 3 is a side view of the hub all other parts being removed to avoid obscurity.

Hub 1 has internal flanges 1' and 1'' formed integral therewith. Flange 1' has slots 1ª adapted to engage the inner edges of spokes 4 and 5. Hub collar 2 is provided with internal flanges 2' and 2'' opposite the previously described hub flanges. Said flange 2' has slots 2ª formed therein for engaging the outer edges of the previously mentioned spokes. Said hub collar is adapted to snugly fit on said hub and is detachably secured thereto by hub securing means 3, which may be either bolts and nuts or rivets as desired.

Spokes 4 are what I shall term inner spokes for the reason that said spokes are provided with reversely bent springs 4' the inner ends of which are substantially secured to said spokes while the outer ends of said springs are secured to the inner edge portion of rim 6. Outer spokes 5 are provided with similarly formed springs 5', the inner ends of which are secured to the outer ends of said spokes, while the outer ends of the last mentioned springs are secured to the outer edge portion of said rim. Since the spokes 4 and 5 are alike in their construction and operation, a detailed description of the spoke 5 seen in Fig. 2 is sufficient. It will be seen that a similar spoke 4 is reversely secured in the described hub. The edges of the inner end portion of spoke 5 are formed at an incline to the major portion of said spoke and have notches 4ª and 5ª formed therein. Said notches are engaged respectively by flanges 1'' and 2'', seen in Fig. 2, for holding said spokes and preventing longitudinal movement thereof thereby providing a spoke which is adapted to be inserted in a hub of simple form in which all of the spoke receiving slots are made in annular alinement, thus materially cheapening the cost of manufacturing said hub. Rim 6 has a channel 6' formed in its outer surface, in which is secured a preferably rubber cushion tire 7. Inner springs 4 and outer springs 5 are alternately secured to the described rim as previously stated for evenly distributing the strain on the same and on their attached parts.

It will be seen and understood that the described springs and spokes are of ample width to prevent the same from being warped out of lateral alinement, that the described elastic nature of both the spokes and springs causes said wheel to be extremely resilient, and that the tire 7 relieves the described wheel from sudden concussion or jar when in use.

I am aware that resilient wheels are old in which the described hub is shown and in which notched spokes are held by internal hub flanges as described. I am also aware that wheels have been invented and are old, in which a single series spokes having springs secured thereto have been shown, but in all such wheels of which I am aware said spokes are arranged in one annular alinement without being inclined for preventing lateral warping of such wheels.

Therefore, what I claim as new and original and desire to secure by Letters Patent is:—

In a resilient wheel, a rim; a cushion tire on said rim; a plurality of elastic outer spokes having inclined inner end portions formed therewith; a plurality of elastic inner spokes having reversely inclined inner end portions formed therewith, all of said inclined inner end portions of said spokes having notches formed in the edges thereof; a hub provided with holding means by which said inclined spoke portions are held in one annular alinement therein with said outer spokes and said inner spokes thus placed alternately and thereby inclined from said hub outwardly and inwardly respectively; a plurality of outer springs the inner ends of which are substantially secured to the outer ends of said outer spokes the outer ends of said outer springs being secured to the outer edge portion of said rim; and a plurality of inner springs the inner ends of which are secured to the outer ends of said inner spokes the outer ends of the last mentioned springs being secured to the inner edge portion of said rim.

In testimony whereof I affix my signature in the presence of two witnesses.

JOHNSON A. SUDDARTH.

Witnesses:
 EDITH WIEDMANN,
 LUKE E. HINTON.